(12) United States Patent
Rajasekar

(10) Patent No.: US 11,831,555 B2
(45) Date of Patent: *Nov. 28, 2023

(54) SYSTEM AND METHOD FOR MANAGING VIDEO STREAMING CONGESTION

(71) Applicant: Sandvine Corporation, Waterloo (CA)

(72) Inventor: Kathiravan Rajasekar, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 17/889,492

(22) Filed: Aug. 17, 2022

(65) Prior Publication Data

US 2022/0393985 A1 Dec. 8, 2022

Related U.S. Application Data

(63) Continuation of application No. 17/340,235, filed on Jun. 7, 2021, now Pat. No. 11,431,640.

(30) Foreign Application Priority Data

Jun. 5, 2020 (IN) .............................. 202011023710
Jun. 1, 2021 (EP) ..................................... 21177072

(51) Int. Cl.
*H04L 47/2475* (2022.01)
*H04L 43/08* (2022.01)
(Continued)

(52) U.S. Cl.
CPC .......... *H04L 47/2475* (2013.01); *H04L 43/08* (2013.01); *H04L 47/803* (2013.01); *H04L 47/805* (2013.01); *H04N 21/2402* (2013.01)

(58) Field of Classification Search
CPC ... H04L 47/2475; H04L 43/08; H04L 47/803; H04L 47/805; H04N 21/2402
See application file for complete search history.

(56) References Cited

U.S. PATENT DOCUMENTS 10,587,583 B2 3/2020 Aluvala et al.
2011/0019542 A1* 1/2011 Bernstein .............. H04L 47/822
370/252

(Continued)

FOREIGN PATENT DOCUMENTS

WO 2018007905 A1 1/2018

OTHER PUBLICATIONS

European Patent Office, European Search Report for Corresponding EP Pat. App No. 21177072.2, dated Mar. 23, 2022.

(Continued)

*Primary Examiner* — Abdulkader M Alriyashi
(74) *Attorney, Agent, or Firm* — Amarok IP Inc.; Neil W. Henderson

(57) ABSTRACT

A system and method for managing video streaming on a computer network based at least in part on a state of a video streaming traffic flow. The method includes: reviewing a traffic flow to determine whether the traffic flow is a video streaming traffic flow; if the traffic flow is a video streaming traffic flow, determine at least one video characteristic associated with the video streaming traffic flow; determining a state of the video streaming traffic flow; determining a priority of the video streaming traffic flow based on the characteristics and the state of the video streaming traffic flow; and allocating bandwidth to the video streaming traffic flow based on the priority; otherwise, if the traffic flow is not a video streaming traffic flow, allowing the traffic flow to continue with the traffic flow's current priority.

18 Claims, 13 Drawing Sheets

(51) Int. Cl.
*H04N 21/24* (2011.01)
*H04L 47/80* (2022.01)

(56) References Cited

U.S. PATENT DOCUMENTS

| | | | |
|---|---|---|---|
| 2014/0169788 A1* | 6/2014 | Hussain | H04L 12/00 |
| | | | 398/43 |
| 2014/0259082 A1* | 9/2014 | Broome | H04L 67/62 |
| | | | 725/86 |
| 2014/0313989 A1 | 10/2014 | Doken et al. | |
| 2015/0319505 A1* | 11/2015 | Patadia | H04N 21/858 |
| | | | 725/34 |
| 2017/0188057 A1* | 6/2017 | Makovetzky | H04N 21/25891 |
| 2018/0027039 A1* | 1/2018 | Moorthy | H04L 1/0002 |
| | | | 709/219 |
| 2019/0394527 A1 | 12/2019 | Chandrasekhar et al. | |

OTHER PUBLICATIONS

European Patent Office, Partial European Search Report for Corresponding EP Pat. App No. 21177072.2, dated Nov. 22, 2021.

\* cited by examiner

SYSTEM AND METHOD FOR MANAGING VIDEO STREAMING CONGESTION

RELATED APPLICATION

The present disclosure claims priority to Indian Patent Application No. 202011023710 filed Jun. 5, 2020, and to European Patent Application No. 21177072.2 filed Jun. 1, 2021 and is a continuation of U.S. patent application Ser. No. 17/340,235 filed Jun. 7, 2021 which are hereby incorporated in their entirety herein.

FIELD

The present disclosure relates generally to computer network traffic. More particularly, the present disclosure relates to a system and method for managing video streaming congestion.

BACKGROUND

Network Operators, Providers, Users are generally striving to maximize the Quality of Experience (QoE) that can be achieved by expanding and optimizing the network and amending the policies associated with the network traffic. Understanding how Streaming Video traffic is delivered and experienced by end-users is important in QoE measurements, as streaming video continues to be a large percentage of the traffic traversing networks.

The Internet bandwidth being used in most networks has been experiencing rapid surges of video streaming traffic over recent years. The increase in video streaming bandwidth is due in part to the rise in the media content providers, for example, Netflix™, Amazon Prime™, Digital Satellite Streaming services like SKY™, as well as regular streaming services like YouTube™. Further, many of these services have seen an increase in the customer subscriptions year over year. Video streaming can create network bandwidth bottlenecks and, as such, in order to enhance subscriber Quality of Experience (QoE) and manage the streaming video, network and content service providers have a desire to manage congestion on the network due to Video streaming.

There is therefore a need for an improved system and method for managing video streaming congestion on a computer network.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for managing video streaming on a computer network, the method including: reviewing a traffic flow to determine whether the traffic flow is a video streaming traffic flow; if the traffic flow is a video streaming traffic flow, determine at least one video characteristic associated with the video streaming traffic flow; determining a state of the video streaming traffic flow; determining a priority of the video streaming traffic flow based on the characteristics and the state of the video streaming traffic flow; and allocating bandwidth to the video streaming traffic flow based on the priority; otherwise, if the traffic flow is not a video streaming traffic flow, allowing the traffic flow to continue with the traffic flow's current priority.

In some cases, the state of the video streaming may be determined to be one of an initial state, a mid-play state or an end state.

In some cases, if the video streaming traffic flow is determined to have the initial state the video streaming may be a high priority traffic flow.

In some cases, if the video streaming traffic flow is determined to be mid-play the video streaming traffic flow priority may be lowered.

In some cases, the method may further include: determining the application type of the video streaming traffic flow as one of the at least one of the video characteristics; determining a ratio of bandwidth consumption for the application type associated with the video streaming application; and allocating the bandwidth based on the ratio of bandwidth consumption for the application type.

In some cases, the method may further include: determining if the video streaming traffic flow has had a fast forward, rewind or seek operation performed; redetermining the state of the video based on the operation performed; and reprioritizing the video streaming traffic flow based on the redetermined state.

In some cases, the method may further include: monitoring a Quality of Experience (QoE) associated with the video streaming traffic flow; and reprioritizing the traffic flow based on the QoE.

In some cases, allocating bandwidth for the video streaming traffic flow may include determining a weighted fair queue for the video streaming traffic flow based on the streaming application type and application's type ratio of demand for bandwidth In some cases, measuring the ratio of the bandwidth consumption for the application type may include: capturing a bandwidth demand for each of a plurality of video streaming applications type; aggregating the bandwidth demand for each of the plurality of video streaming applications over an aggregating factor; and determining the ratio of bandwidth consumption for each application type based on the aggregated bandwidth demand.

In some cases, the aggregating factor may be selected from the group comprising: a geographic location, a cell site, a group of subscribers in a link, a group of subscribers in a network In some cases, the initial state may be between 30 and 60 seconds.

In another aspect, there is provided a system for managing video streaming on a computer network, the system including: an analysis module configured to review a traffic flow to determine whether the traffic flow is a video streaming traffic flow, and if the traffic flow is a video streaming traffic flow, determine at least one video characteristic associated with the video streaming traffic flow and a state of the video streaming traffic flow; an allocation module configured to determine a priority of the video streaming traffic flow based on the characteristics and the state of the video streaming traffic flow; and at least one shaper configured to allocate bandwidth to the video streaming traffic flow based on the priority.

In some cases, the state of the video streaming may be determined to be one of an initial state, a mid-play state or an end state.

In some cases, if the video streaming traffic flow is determined to have the initial state the video streaming may have a high priority traffic flow.

In some cases, if the video streaming traffic flow is determined to be mid-play the video streaming traffic flow priority may be lowered.

In some cases, the analysis module may be configured to determine the application type of the video streaming traffic flow as one of the at least one of the video characteristics; and the system may further comprise a measuring module configured to determine a ratio of bandwidth consumption for the application type associated with the video streaming application; and the at least one shaper may be configured to allocate the bandwidth based on the ratio of bandwidth consumption for the application type.

In some cases, the analysis module may be further configured to determine the video streaming traffic flow has had a fast forward, rewind or seek operation performed and redetermine the state of the video based on the operation performed; and the allocation module may be configured to reprioritizing the video streaming traffic flow based on the redetermined state.

In some cases, the system may further include: a monitoring module configured to monitor a Quality of Experience (QoE) associated with the video streaming traffic flow; and the allocation module may be configured to reprioritizing the traffic flow based on the QoE.

In some cases, the at least one may be is configured to allocate bandwidth for the video streaming traffic flow comprises determining a weighted fair queue for the video streaming traffic flow based on the streaming application type and application's type ratio of demand for bandwidth In some cases, the measuring module may be configured to measure the ratio of the bandwidth consumption for the application type by: capturing a bandwidth demand for each of a plurality of video streaming applications type; aggregating the bandwidth demand for each of the plurality of video streaming applications over an aggregating factor; and determining the ratio of bandwidth consumption for each application type based on the aggregated bandwidth demand.

In some cases, the aggregating factor may be selected from the group comprising: a geographic location, a cell site, a group of subscribers in a link, a group of subscribers in a network.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Figure 1A:
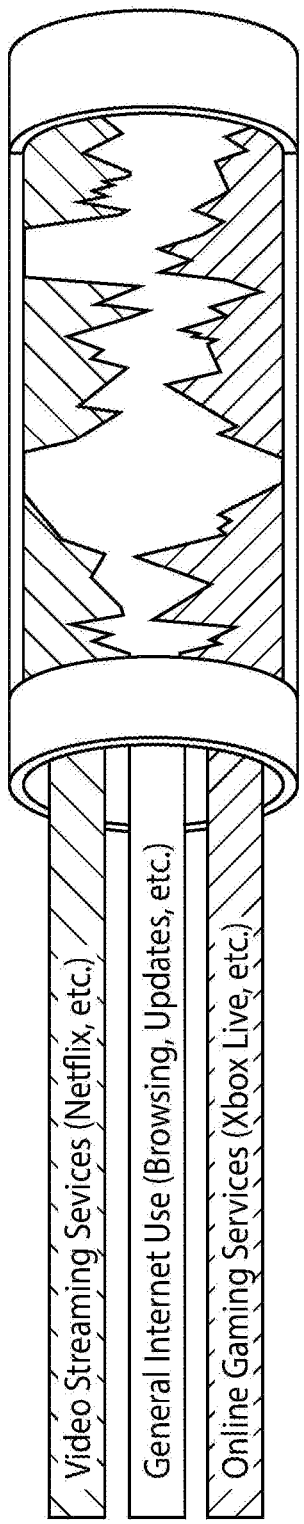
FIGS. 1A and 1B illustrate traffic flow with no prioritizing and the same flow with prioritizing by application type according to an embodiment herein.

In the following, various example systems and methods will be described herein to provide example embodiment(s). It will be understood that no embodiment described below is intended to limit any claimed invention. The claims are not limited to systems, apparatuses or methods having all of the features of any one embodiment or to features common to multiple or all of the embodiments described herein. A claim may include features taken from any embodiment as would be understood by one of skill in the art. The applicants, inventors or owners reserve all rights that they may have in any invention disclosed herein, for example the right to claim such an invention in a continuing or divisional application and do not intend to abandon, disclaim or dedicate to the public any such invention by its disclosure in this document.

Generally, the present disclosure provides a method and system for managing video streaming. Embodiments of the method and system are configured to determine if a traffic flow is a video streaming traffic flow. The system determines video parameters and a category for the video streaming traffic flow. In some cases, the video streaming traffic flow will be categorized as start, mid-play or end. Based on the video parameters and category, the system may determine a priority level for the video streaming traffic flow and a shaper may prioritize the traffic flow based on the priority level.

It has been observed that internet bandwidth consumption during peak hours can be greater than 50% Video Streaming. During peak network congestion, unmanaged Video streaming applications can add to the congestion at the same time. Video Streaming is generally impacted with down shifts of quality and resolution due to packet delays and packet loss, which may result in relatively poor Quality of Experience for the end customers.

Some video streaming applications may use different video codecs and buffering techniques and may further use customized techniques to manage and increase the video streaming quality of experience for their end users. Due to the variance in management by these applications, some of the video streaming services are more aggressive in consuming bandwidth to ensure superior quality of experience for their streaming service. This aggressive consumption may impact other players/providers in the video streaming applications space which rely on standard streaming techniques. For example, there might be applications like YouTube™ that may use techniques to consume most of the share of available bandwidth compared to that consumed by applications like Sky™ or Netflix™ for their streaming during the same congested hours. This overconsumption by YouTube™ may result in bad QoE for the other application(s).

As a service provider or an end user or subscriber, the Quality of Experience in Video Streaming is a crucial measure of experience. The Quality of Experience (QOE) is generally determined by a plurality of factors. For example, for a subscriber during Video Streaming, the subscriber would benefit from a fast start, consistent streaming, effective resolution, effective Bandwidth Management and the like. For a Service Provider, effective management of the available overall Bandwidth and ensuring better Video QoE for a large portion of the plurality of subscribers is generally desired.

FIG. 1A illustrates a bandwidth distribution of a network when no prioritizing of the bandwidth is performed. Without prioritizing traffic based on the categories and the available bandwidth, certain categories of network traffic may dominate the available bandwidth and reduce the QoE of other categories of traffic.

Figure 1B:
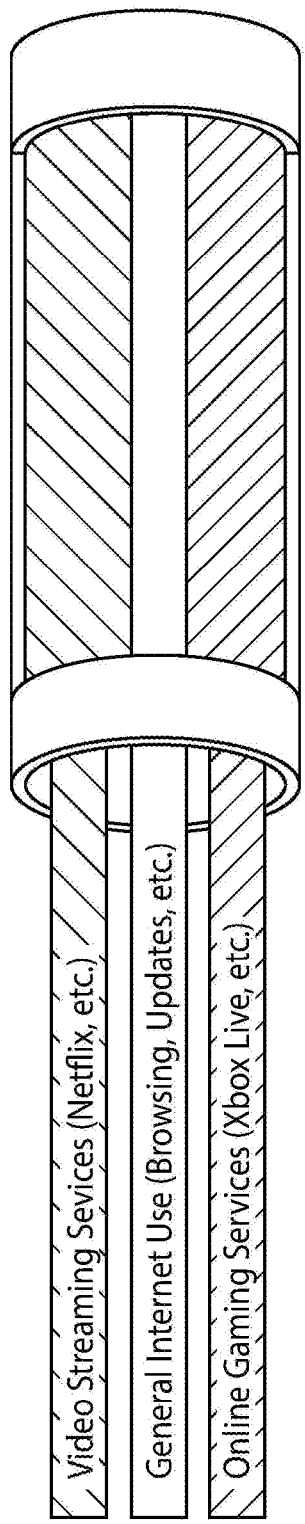

FIG. 1B illustrates a traffic category breakdown when traffic categories are prioritized. During the time of network congestion or any other network limiting factors, one option is to provide a fair distribution of the bandwidth for most of the video streaming applications based on their ratio of network demand. The current state of the video and what could be a good enough transfer rate for the video to stream with the good quality may be determined, thereby achieving superior QoE for most of the customers.

There are various techniques that can be employed in a network to improve overall network quality. One technique is a generic traffic shaping and prioritization. Traffic shaping and prioritization techniques are applied to improve the overall Quality of Experience of the Internet traffic. This might also impact the QoE of the video streaming as an overall outcome if the streaming is highly prioritized. In other cases, this might provide lower effectiveness as there could be more bandwidth consumption conflicts between the various different video streaming applications.

Bandwidth congestion on the access network is often managed by shaping the subscribers' internet traffic with various traffic prioritizations, as shown in FIG. 1B. The video streaming applications are typically high in bandwidth utilization and moderately sensitive towards the down shifts of quality and resolution due to delays and packet loss, which could be an effect of network congestion. As detailed herein, it has been observed that not all the video applications are designed to react to congestion and gain effective bandwidth in a similar manner.

Figure 2:
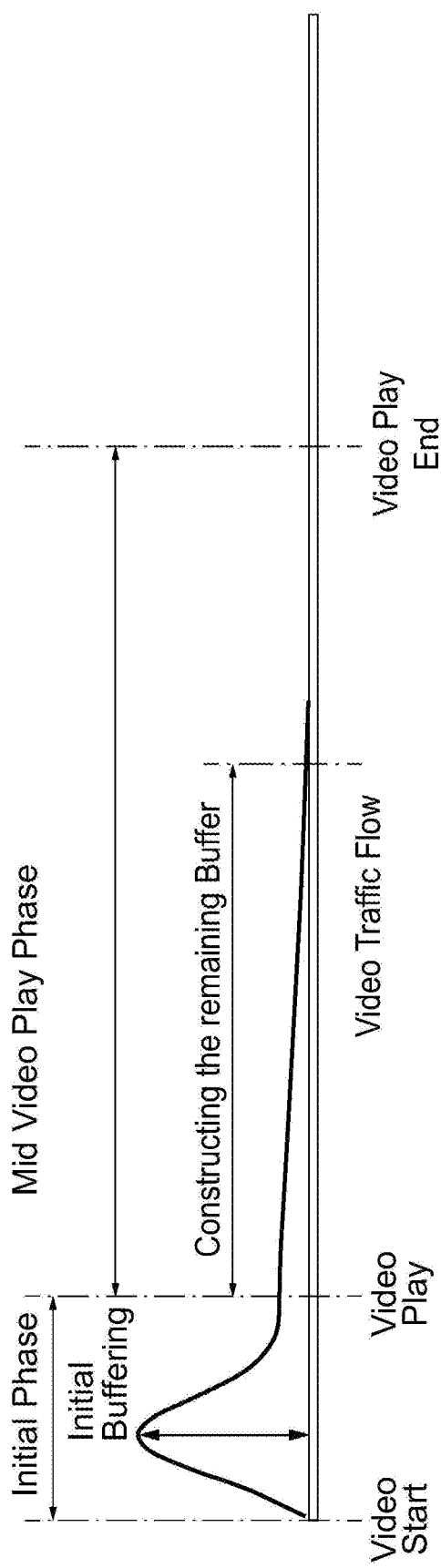
FIG. 2 is a graph illustrating the various phases of a video streaming traffic flow.

FIG. 2 illustrates a lifecycle of a video stream. In an initial phase, after a user selects a video but prior to the video commencing, a video buffer is created. A newly started video may consume higher bandwidth (BW) in order to construct a video buffer that is intended to allow the video to start playing without requiring breaks or pauses to refill the buffer. After the initial phase, the video will start to play and the buffer may work to load the complete video. In some cases, the video may complete downloading at a slower rate than in the initial phase. The video buffer has frequently completed the download of the full video, long before the video play ends, as shown in FIG. 2. If the video is fast forwarded, or skipped to a location further in the video stream, the buffer may need to consume significant bandwidth again if the buffer has not downloaded past the spot in which the movie restarts playing.

Embodiments of the system and method are intended to perform one or more functions such as measuring the ratio of bandwidth distribution among different video applications, to detect congestion, define the video characteristics and manage the video streams according to the different applications and characteristics with the use of traffic shaping. Embodiments of the system and method are intended to review and manage the Video Streaming at various stages of video, adjust the priority of the Video based on the current stage and/or category of the video by allowing reasonable bandwidth for that stage, and thus provide a higher overall Quality of Experience (QoE). This QoE improvement for Video Streaming flows is provided by adapting the rate of downloading or filling the buffer, by adapting the actual bandwidth required for the video streaming flow (bit per second) to give the application an appropriate QoE/BW/resolution based on how the adaptive codecs adapt to adjust to the current bandwidth. By controlling the amount of bandwidth based on a stage of the video streaming allows flows to be prioritized based on the flow's need.

Figure 3:
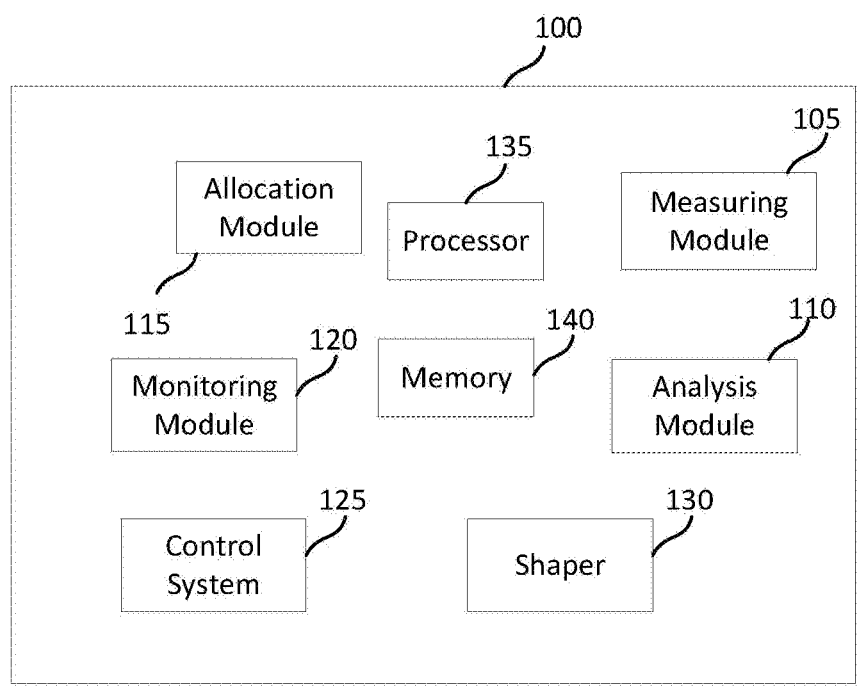
FIG. 3 illustrates a system for managing video streaming congestion according to an embodiment.

FIG. 3 illustrates an example embodiment of a system 100 for managing video streaming congestion. In this embodiment, the system includes an analysis module 105, a measuring module 110, an allocation module 115, a monitoring module 120, a control system 125, at least one shaper 130, at least one processor 135 and at least one memory component 140. In some cases, the system may include a plurality of processors, for example, one processor per module or the like. The at least one processor 135 is configured to execute instructions stored in the at least one memory component 140 in order to allow each module to perform the tasks as detailed herein. In some cases, the system may be distributed and may be housed in a plurality of network devices. In other cases, the system may reside in a single network device. In some cases, the memory component 140 may be included as an internal component of the system. In other cases, the memory component may be housed externally or in a cloud and may be operatively connected to the system 100 and the components of the system.

The analysis module 105 is configured to review traffic flows to determine which flows are video streaming traffic flows. The analysis module 105 is further configured to determine video parameters (sometimes referred to as characteristics) from each streaming video flow, for example, the streaming application, the quality of the video, the streaming state of the video, and the like. In some cases, the analysis module 105 may further determine the network or localized region's Quality of Experience. In some cases, the analysis module 105 may further determine a geographical location of the subscriber. The analysis module 105 is further configured to determine the stage of the video streaming traffic flow in relation to, for example, the phases illustrated in FIG. 2, and may categorize the stage as, for example, start, mid-play or end of the video stream. It will be understood that the terms "start", "mid-play" and "end" are intended to detail where the current position is of the video stream and other or additional classification terms may be used. For example, additional classifications may include "fast forward", "rewind" or the like.

The measuring module 110 is configured to measure the ratio of the bandwidth consumption for various video streaming applications. The measuring module 110 may further aggregate the measurements based on the analysis, the parameters, and the categorization done by the analysis module 105. The measurement module output is intended to be provided as input to the control system 125 and the at least one shaper 130. In some embodiments, the measurement module output is intended to be categorized Per Video Streaming Flow (application)/Per Video Streaming flow category (determined by the analysis module 105) to be synchronous with the control system 125 and the at least one shaper 130 managing the traffic bandwidth.

In some cases, the control system 125 may include the allocation module 115 and the monitoring module 120. The allocation module 115 is configured to determine the priority of the video streaming traffic flow and provide appropriate bandwidth allocation to the flow as detailed herein. The allocation module 115 may be operatively connected with at least one shaper 130 and provide input to the at least one shaper for determining the priority of the video streaming flow.

The monitoring module 120 is configured to monitor the video streaming traffic flows and determine whether the traffic flows are being properly characterized and prioritized. In particular, the monitoring module 120 is configured to monitor the stage of the video streaming traffic flow to prioritize the flow depending on the demand for bandwidth.

The at least one shaper 130 is intended to apply at least one traffic management action to traffic flows. In some embodiments, the traffic management action may be, for example, Priority and Weighted Fair Queuing based on the determined traffic priority as per the video streaming categorization and input from the allocation module 115. The at least one traffic management action may substitute for or be in addition to any previously applied traffic management actions.

Embodiments of the system and method are intended to efficiently manage network bandwidth, enhance the subscriber video streaming experience by insulating video streaming applications from a back-off effect of other aggressive streaming techniques described herein. Further, embodiments of the system and method are intended to provide the video streaming traffic flows protection from bandwidth hogging non-critical or low priority applications like FTP, Torrents, heavy downloads, and the like. It is intended that the embodiments of the system and method are intended to effectively distribute any saved bandwidth to each video streaming application based on the determined demand at various stages of the video streaming.

In some embodiments of the system and method, it is intended to manage the video streaming traffic by being agnostic towards a plurality of access network types, for example, wireless, fixed access, or the like, the consolidation of the traffic, for example, radio cells, DSLAMs, and the like, and also agnostic towards the different video streaming application types and codecs. As noted herein, streaming video's QoE may depend on, for example, runtime adaptation, startup time of the video, and other factors.

Figure 4:
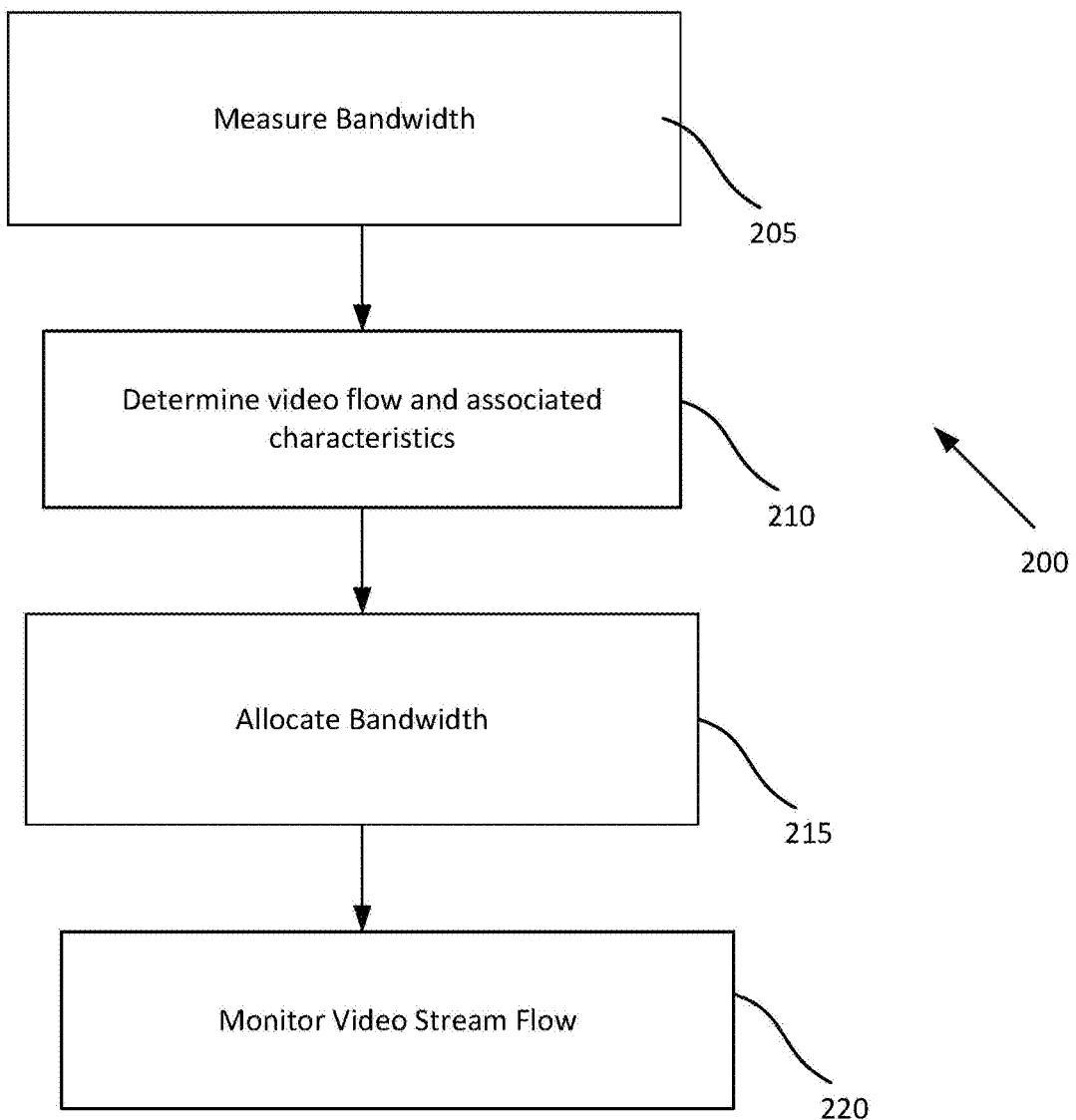
FIG. 4 illustrates a method for managing video streaming congestion according to an embodiment.

FIG. 4 illustrates an embodiment of a method 200 for managing video streaming congestion. At 205, the measuring module 110 measures the ratio of bandwidth consumption for various video streaming applications. At 210, the video streaming flows are determined and general characteristics of each of the flows are reviewed by the analysis module 105. In particular, the analysis module 105 may determine at least some of the following characteristics of the video flow, for example, streaming application, quality of the video (Standard definition, high definition, etc.), streaming state of the video, network or localized regions' Quality of Experience, or the like. At 215, the allocation module may determine an associated shaper as well as determine the network congestion and define the shaper with traffic prioritization considering the different tolerance levels and traffic ratio of applications and categories. The allocation module may further use the defined characteristics to manage the video streaming application traffic flows. At 220, the monitoring module 120 may continue to monitor the state of the video stream and update the priority of the flow based on the state of the video stream or take other traffic enforcement actions.

In some cases, for measuring the ratio of the bandwidth consumption for various streaming applications, the measurements may be defined in a manner that is intended to capture the bandwidth demand of each video streaming application uniquely identified by the application and the aggregating factor. In a particular example, a geographic location (geo-location) like a cell site, a group of subscribers in a link or in a network, or the like may be reviewed by the measuring module 110.

This measurement's peak value may be used to ascertain the ratio of the bandwidth to be fairly distributed across the different video streaming applications at the aggregated level. In some cases, embodiments of the system and method may associate a QoE metric as 'bandwidth by video streaming application by category (or by geo-location)' and treat the continuous calculated value as a benchmark that could be applied to the ratio for the next interval. In a particular example, the system may determine over a predetermined interval, for example the last 12 hours, 24 hours, the last 2 days, or the like, the bandwidth of Netflix™ by category (initial/start, mid-play, end) by geo-location (for example, a particular region like: Waterloo Region). The system if further configured to calculate the same data for other Video streaming applications for example: YouTube™, SKY™, and the like. This is intended to provide a ratio that can be applied for the forthcoming interval (for example, the next 24 hours) to manage the Video streaming traffic.

Further, the analysis module 105 is configured to determine video streaming traffic flows and devise characteristics or parameters of a streaming video. In particular, the analysis module 105 may determine the video streaming traffic flows across different application types. Determining the application types may be used in order to calculate the ratio of the bandwidth and accurately isolate the flows and feed to the right shaping priorities. Various application types may include, for example, YouTube™, Netflix™, Amazon Prime™, SKY™ satellite services, and the like.

In some cases, the analysis module 105 may further define and distinguish other characteristics related to the quality of the video to assess the effective bandwidth consumed against the required quality for the video, for example, Standard Definition, High Definition with different resolutions or the like.

The analysis module 105 is configured to determine the streaming state of the video and categorize the video by the state. The states may include, for example, the Initial Start, which would be the phase of the video during the start. In the state, the video starts to buffer until the video flow reaches the desired buffer health. Further, Video Initial Reactivity time and the buffer health may be important for subscribers to become "hooked" on to the video. In a Subscriber's perspective on Video Quality of Experience, for a user to persist on to watching a video to completion requires not only good content but also an acceptable level of QoE. It will be understood that a subscriber is likely to stop watching a video if the QoE degrades below an acceptable level. By reducing buffer time, triggering quick playback, reducing stall that may be caused by buffering due to slow connections, lower bandwidth in congestion, or the like, providing effective bandwidth by prioritization, and via other traffic management, the QoE is intended to be at an acceptable level for subscribers.

Another state of the video may be the Mid Video Play Cycle State. This state may include the duration in which video is playing thereby the application desired to maintain the buffer for seamless video play without pause. A still further state may include the Slider state. In this state, the slider action of Video, moving forward or rewind of the video resulting in the re-buffering of the Video The monitoring module 120 is configured to continuously assess and monitor the Network Quality of Experience and Video Quality of Experience. These assessments may be fed as inputs to the system, which will help in determining when to trigger the start or stop of the management of the Video streaming traffic. This monitoring may be for a complete network or a specific subset (region) of the network based on where the Video Streaming would benefit from being managed at a consolidated level. Various techniques are known that may be used to help determine the network QoE. The benefit is categorized by multiple factors, as detailed herein, and these parameters are intended to act as input variables. The state of the video is intended to determine the ratio of the bandwidth (aggregated across all the video and state in the selected subset) and when the Video's Bandwidth Demand varies based on the video. It will be understood that when the buffering is complete, the demand in bandwidth may reduce. It is intended that these parameters may be consistently assessed by the control system 125.

Typically, this process could be even further alleviated if the management of the Video Streaming applications is to be devised without any influence on the network congestion. The process of managing the network bandwidth tends to be considered a high importance for service providers, especially during congestion in the network. At the time of peak network usage, the service providers will be keen to maintain the best, end-user QoE. Thus, as video streaming tends to be influenced significantly based in part on the QoE, it is intended that embodiments of the system and method detailed herein will provide benefit to the service providers.

In other cases, there may be situations for service providers where the service provider would benefit from or see the value in managing the Video Traffic irrespective of whether the network is congested. For example, the service provider may wish to regulate or standardize the Video Streaming bandwidth management, Usage Service Plans based on Video Prioritization, or the like. In this case, the system may not determine or use a congestion metric as an input parameter.

Figure 5:
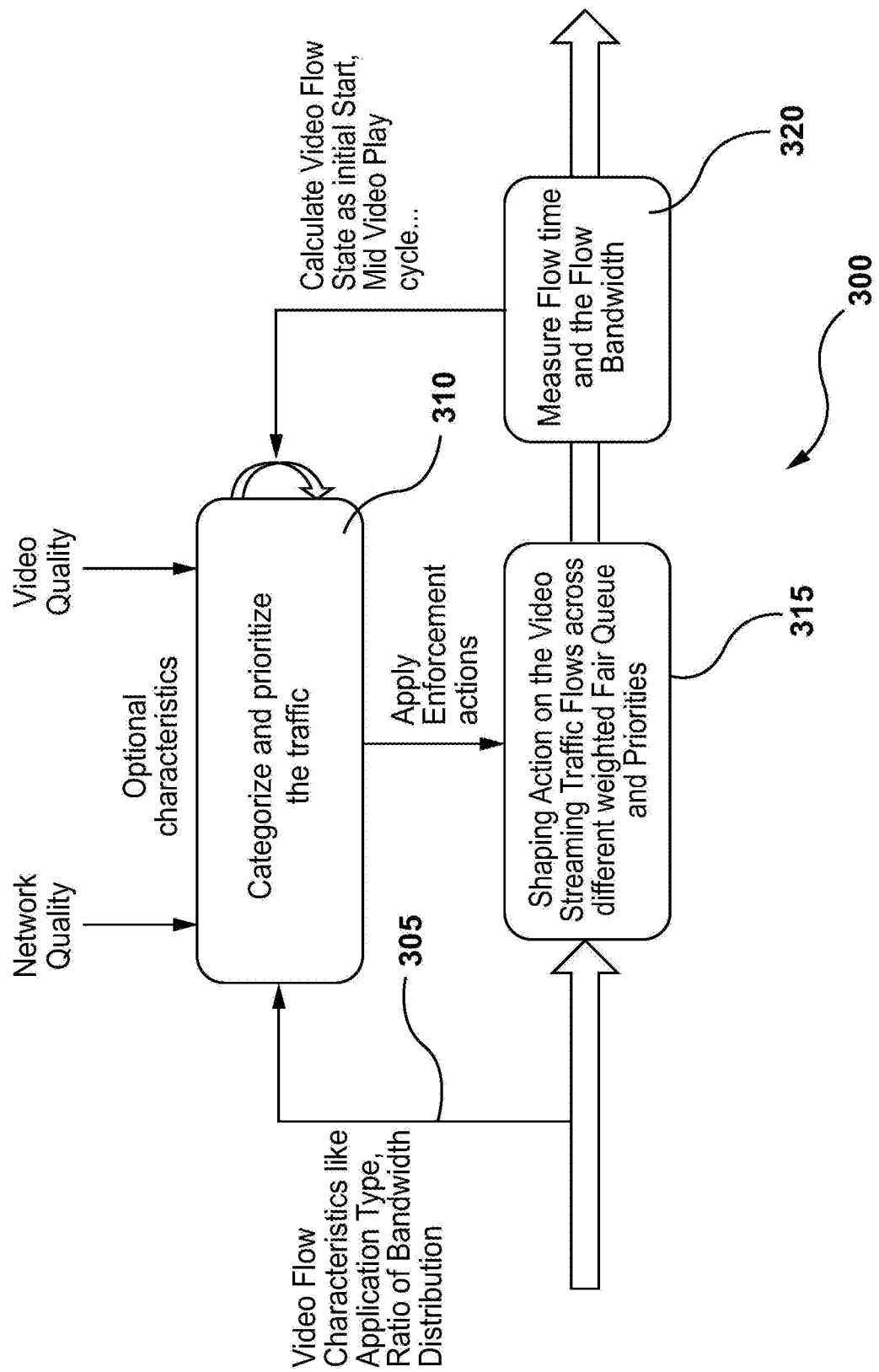
FIG. 5 illustrates the data flow through the system according to an embodiment.

FIG. 5 illustrates an embodiment of information flow 300 through the system. The measuring module 110 is configured to measure the ratio of bandwidth distribution among different video applications. The control system is fed with Video streaming flow parameters or characteristics determined by the analysis module 105 and bandwidth to detect congestion, define the video states, and manage the video streams according to the different applications and characteristics with the use of the traffic shaping, at 305. As the analysis module 105 determines the video flow characteristics, the system 100 is configured to categorize and prioritize the traffic, at 310. The priority of the traffic may be based on various factors, such as the network quality, the video quality, the application type or other determined characteristics. Once the characteristics have been determined, the at least one shaper may apply enforcement actions or traffic actions on the video streaming traffic flows across, for example, different weighted fair queues and priorities, at 315, based on the allocation determined by the allocation module 115. The system may also be configured to determine the state of the video and continue to measure the flow time and the flow bandwidth in order to update the priority of the flow as the video playing progresses, at 320.

Figure 6:
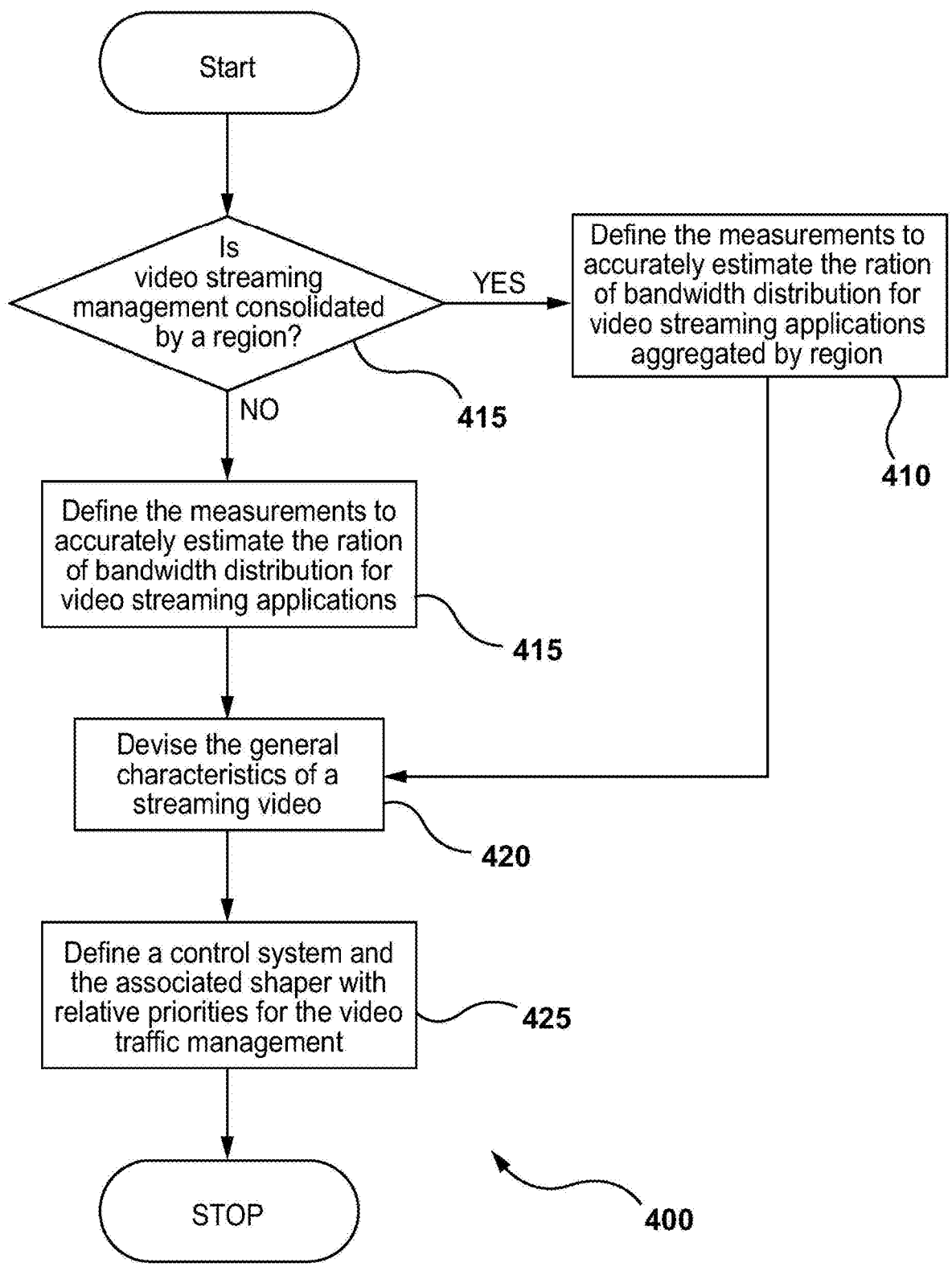
FIG. 6 illustrates a method for bandwidth distribution for a method for managing video streaming congestion according to an embodiment.

FIG. 6 illustrates a method 400 to manage the video streaming application traffic flows according to an embodiment. At 405, the system begins by determining whether the video streaming management is consolidated to a region. A region is intended to be a granular section of traffic associated with subscribers for whom the video streaming is managed. In some cases, the region may be a geo-location, for example, a city, a radio cell or site, a DSLAM, a corporate office, an apartment or the like. If the video is consolidated by a region then the measuring module 110 is intended to determine measurements to estimate the ratio of bandwidth by region, at 410. If not, at 415, the measurements to estimate the ratio of bandwidth may be done for the network as a whole. In some cases, instead of region, a different selection may be made to provide for a granular section of traffic associated with subscribers to be managed. General characteristics of the video may then be determined, at 420, via the analysis module 105. After review of the characteristics, the control system 125 and associated at least one shaper may determine an appropriate priority for the video streaming traffic flow, at 425.

The management of video streaming applications at the time of congestion is intended to be strategic prioritization and isolation of the traffic across different weighted fair queues (WFQ) in the at least one traffic shaper. Placing the video in a relevant WFQ based on the streaming application type and the video's ratio of demand for bandwidth, which is intended to provide for each application to acquire its appropriate share agnostic to the protocols used and would not hover over or creep into other applications' bandwidth beyond the demand. This method is intended to protect the boundary of the least greedy or bandwidth-demanding streaming protocols.

Each video streaming application flow may require different traffic prioritization and management in traffic shapers based on, for example, various stages in time and characteristics of the application traffic flow. The system 100 is intended to provide continuous monitoring, via for example the monitoring module 120, of the characteristics over time and provide feedback to the shapers or the analysis module 105 of the system based on changes to the characteristics as detailed herein.

When the Video streaming traffic flows are placed on the same priority, not all the video applications and/or video codecs and/or solutions are designed to react to congestion and gain effective bandwidth. This may result in an imbalance and inferior Quality of Experience for some video streaming applications, whereas some other applications, which are designed to hog bandwidth may receive more bandwidth at a cost to the others.

Conventionally, the prioritization on the traffic shapers have been typically based on the applications' tolerance to congestion. Traditionally, the traffic may be classified as:

Priority 1—High: Low Tolerant Applications
Priority 2—Medium: Moderately Tolerant Applications
Priority 3—Low: Highly Tolerant Applications Embodiments of the system and method disclosed herein are intended to determine the characteristics of each video streaming traffic flow. Each of the independent video streaming application (or) each group of similar application flows may be divided into different shaping channels (for example, independent shaper queues). It is intended that Fair weights based on the Bandwidth demand distribution may be determined via the bandwidth measuring done by the measuring module. This is intended to provide for the same available bandwidth for video streaming applications. The bandwidth is effectively divided and distributed fairly across different Weighted Fair Queues with relative weights (x:y:z) where x, y, z are the assessed traffic demand through the control system 125 and measurements as detailed herein. In some cases, this could may be based on the bandwidth measurements on the network as a continuous input. In other cases, the control system 125 may use an automated calibration technique.

Embodiments of the system and method are intended to provide for the prioritization of video streaming applications together with other internet traffic. One example is the following:

Highly Critical and Sensitive Traffic—Traffic that is critical and sensitive to congestion or should be prioritized as high. This traffic could be the control flows, authentication or communication establishment with the peers.

Moderately Sensitive Video Streaming Traffic—Typically, most of the video streaming applications would be placed in this priority. This is considering the typical priority of bandwidth that video streaming consumes and the sensitivity of the applications and direct impact to the quality of experience.

Low Sensitive and Tolerant Traffic—Some video streaming traffic and other non-sensitive traffic could be categorized in this priority. The video streaming traffic that would be placed in this priority may be long duration video streaming flows and the like.

For Moderately Sensitive video streaming traffic, the priority of traffic may be categorized in to various independent weighted fair queues for the independent video streaming application (or) each group of similar application flows based on the ratio assessed on the traffic demand over the aggregated entity for example, a specific region or the whole network. For example, W1, W2 . . . , Wn may represent a plurality of weighted fair queues with ratio R1, R2 . . . , Rn assessed by the measurements and current bandwidth allocated by the control system and traffic shaper. The ratios may vary during peak traffic hours of video streaming. In some cases, through observation, it has been seen that video streaming traffic may constitute 55-60% of the overall network. Currently, the top 4 video streaming applications, are as follows: 25-30% of streaming is YouTube™, approximately 15-20% is Netflix™, Amazon Prime™ and others constitute some 10%.

Other video streaming traffic and other non-sensitive traffic could be categorized in low priority. The video streaming traffic that would be placed in this priority would be for example, the long duration video streaming flows and the like.

For instance, the prioritization and traffic shaper configuration could be as follows:

Priority 1: All Critical Applications, for example, VoIP, Web browsing

Priority 2: Video Streaming Classification & Prioritization. Classified as Weighted Fair Queues with appropriate measured ratio in peak duration
  WFQ1: Video streams of Application-A that are in the 'Initial Buffering State' phase: Ratio R1
  WFQ2: Video streams of Application-B that are in the 'Initial Buffering State' phase: Ratio R2

Priority 3 with or without WFQ: Video streams of Applications that are in the 'Mid Video Play Cycle' phase: Ratio R3

Priority N: Bulk Downloads and File transfers

In some cases, the traffic flows may be further classified to add the flows that has the Video State Change and Manage the Re-buffering back to the Priority 2 WFQs. By reprioritizing these traffic flows, it is intended to enhance the Video Streaming Quality on Demand.

In some cases, embodiments of the system and method may provide for Pacing the Video Streams based on determined properties such as the video state. Video Streams of an application may be prioritized higher during the initial N* seconds to build enough buffer quickly and start playing. It will be understood that N would be the time based on the bandwidth for the video stream to effectively perform Initial Buffering and start the Video with good quality at a minimal wait. In some cases, the initial buffering period may be between approximately 30-60 seconds. In some cases, the system and method can be configured to review Video Flows periodically to determine state, for example, every 5 seconds, 10 seconds, 20 seconds, 30 seconds or a different time as appropriate. Videos typically require more bandwidth and speed in the initial buffering phase in order to provide reliable playback once the video has started.

When sufficient buffer is available and the video starts to play, the priority of the video traffic flow may be lowered. The video, while streaming, is able to progressively buffer. The video streaming traffic flow may be dynamically allowed lower bandwidth, by changing the priority of the video flow, to allow enough buffer to prevent the video from stalling. It is intended that the method and system provided herein can use the priorities and techniques, such as Weighted Fair Queues, to allocate effective bandwidth to the various video traffic flows based on the video streams state, for example, Initial Buffer (High Priority), Mid-Play (Medium Priority) and the like. The Ratio may be determined through WFQs (for example, 20%—YouTube™, 10% for Netflix™ and the like). By prioritizing effectively, the video application is intended to receive the consideration to have more bandwidth than any other Lower Priority applications, which is intended to provide for enough buffer to prevent stalls.

In a particular example, for the first predetermined time period (for example, N seconds) of the streaming flow, the system may be configured to prioritize and give a higher ratio of bandwidth to a newly commenced video streaming traffic flow. This prioritization is intended to allow the video streaming traffic flow to buffer the required content quickly at higher rates. Once the buffer has acquired a sufficient amount of data, the video streaming traffic flow may be moved under a lower Weighted Fair Queue to manage the progressive buffering at a reduced level bandwidth. For longer video flows, in some cases, Key Performance Indicators (KPIs) may be considered, for example: Video stalls, Buffer exhaustion or the like and content requests to re-prioritize to the higher priority. Re-prioritizing may be optional and is intended to allow the system to be more effective. In prioritizing the video stream, the system may determine, for example: Video State (Initial, Mid Play, End, or the like), Traffic Demand, Video Applications and Ratio, Network Congestion and the like, as detailed herein.

Considering that some Video Parameters, for example, Video Stalls and Buffer Health may be made available to the system, the system may use these video parameters to move a video flow to a different priority. In a specific example, if the Video is in the Mid Play interval and for some reason, for example, bad connectivity or a fast-forward event or the like, the Video buffer health is determined to be bad, the system may consider this parameter and move the Video flow to the Higher Priority bucket (for example, the Initial Start priority) to improve the Video Experience.

Embodiments of the system and method are intended to provide an advantage in managing the bandwidth allocation for Video Streams based on dynamic Video state and feedback. The system and method are intended to manage video streaming traffic flows by prioritizing and allocating the bandwidth at a desired level, which is intended to prevent unnecessary rapid buffer build up for the video. Traditionally, this initial rapid buildup provided for the majority of the video to be downloaded to the buffer, prior to the subscriber reaching that point of viewing the video. Prioritizing and redirecting the bandwidth is intended to benefit the videos that are in critical requirement at that point to ensure effective QoE.

In initialization, each video application may have a few control flows to the Video application server for establishing connection, authentication, or any other enabler for the video streaming. After the initial control flows, the streaming connection will be established for a start of video streaming flow cycle. In some cases, this start cycle will be a predetermined time, for example, 30 to 60 seconds or the like depending on the video characteristics, of streaming and can be considered the initial state where the priority of the traffic is high.

The video streaming traffic flows may in the 'Initial Streaming State' (for example, for an initial interval of for example, 15 seconds, 30 seconds, 60 second, or the like). This initial interval may be shorter or longer and may be configured by a network operator or determined dynamically based on video characteristics. The video then moves to a Mid-Play State where the flows would be in the buffering state, where the flows may be downloading at a slower rate to fill up the buffer for the streaming traffic flow until the buffer is completed with the full video.

When there is a video being played and the video is being played at a consistent pace, the buffer is being filled for the forthcoming frames to be watched. In another scenario, the user either moves the Video slide to a time forward in the video or dragged back to some other time in the past frames. This movement in the video can sometimes be considered to initiate a new flow for the video streaming applications.

Figure 7:
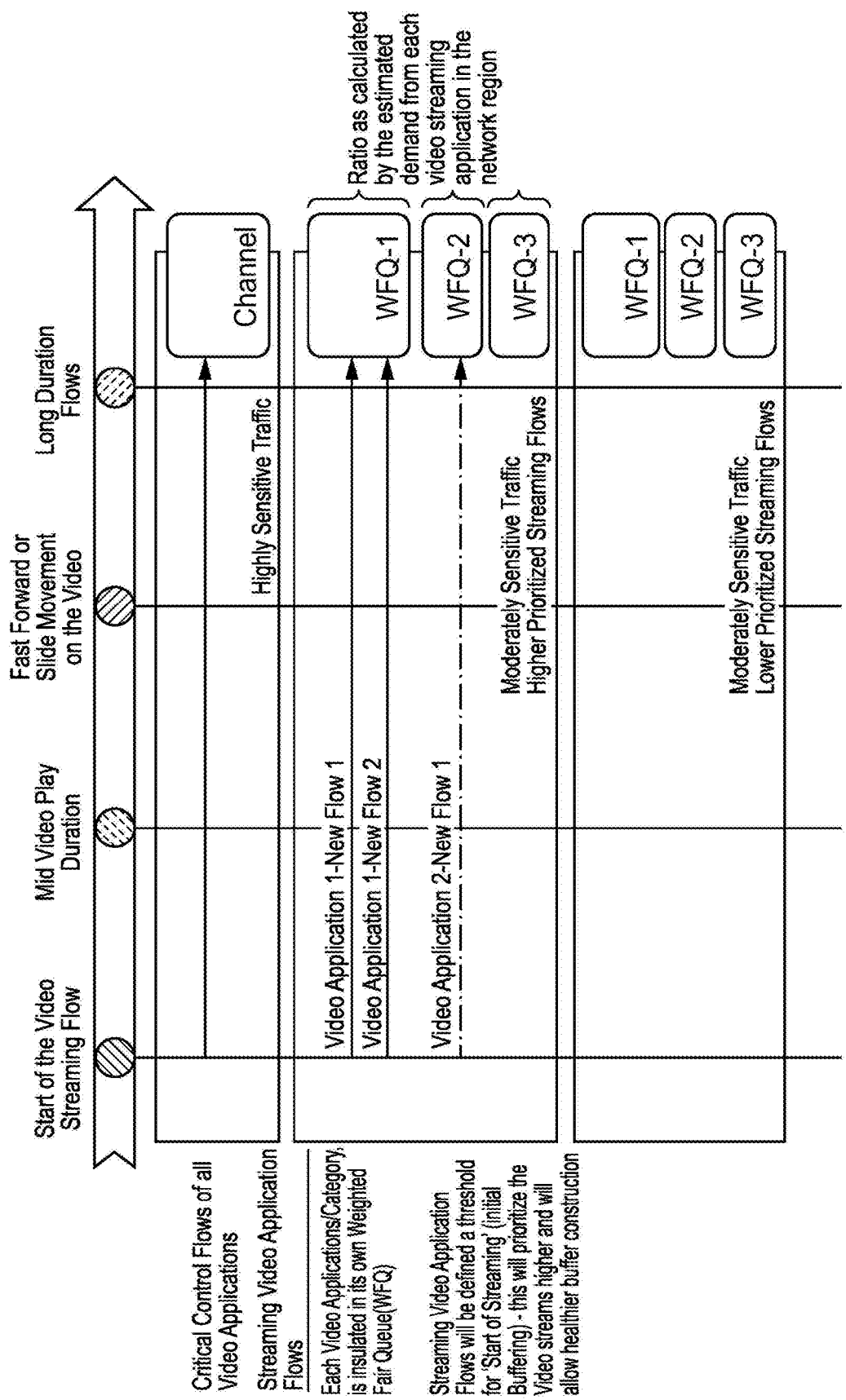
FIG. 7 illustrates a illustrates a video streaming traffic flow prioritization at an initial buffering state.

FIG. 7 illustrates examples of different Traffic Shaping priorities that classified traffic may fall under at time T1, as an example, this may range from a Highest Priority at the Top to a Lowest Priority at the bottom. FIG. 7 illustrates a video streaming traffic flow prioritization at an initial buffering state. The figure illustrates two different applications or video streaming protocols. In this specific example, Application 1 may be a YouTube™ video flow and Application 2 may be a Nefflix™ video flow. It will be understood that in a network there will be many video streaming traffic flows going simultaneously.

At time T1, there are two different applications 1 and 2 streaming video being used by two users. Both of the video streaming flows started and the system is configured to categorize both of these flows as a higher priority at the start of the streaming. Classifying as higher priority is intended to enable the applications to have greater bandwidth share so that the video streams are able to create the initial buffer to provide the applications better quality and faster start of playing video. Generally, the longer buffering time, the longer it takes to start video playing, the lower the QoE.

Figure 8:
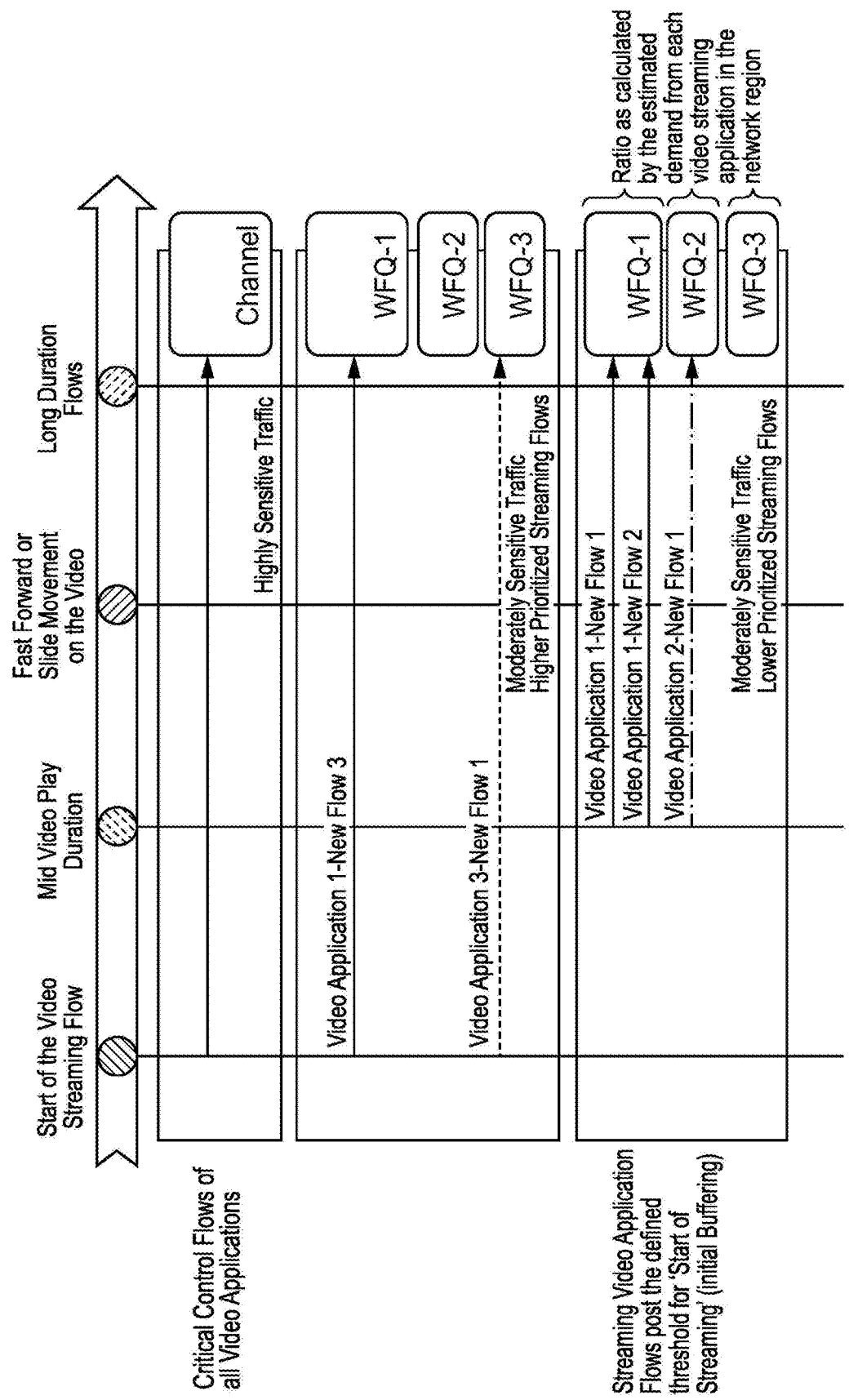
FIG. 8 illustrates a video streaming traffic flow prioritization at a mid-video play cycle state.

FIG. 8 illustrates an example of a video streaming traffic flow prioritization at a mid-video play cycle state, at time T-2. The New Flows that started at the Time T1—as noted in FIG. 7, have moved on past the initial buffering (for example, past a time of approximately 30-60 seconds or as appropriate) and are now considered by the system to be in a Mid-Play cycle. Thus, the Video Flows that were in the Higher Priority, letting them gain the greater share of bandwidth to fill up the initial buffer at quick pace and start the video as fast as possible (by categorizing them in the higher priority), are now moved to the mid-play cycle. It is intended that, at the time the system moves the video streaming flows to a mid-play category, the video streaming traffic flows have good buffer health.

FIG. 8 illustrates the video streaming traffic flow at time T2, there are new Video Streams started by some users (Application 1) and another Application 3. At the time when flows started at T1 shifted to lower priority, the new Video streams that are started are prioritized in higher priority to allow these flows to gain a greater share of bandwidth. Gaining a greater share of the bandwidth is intended to allow for quick buffer creation, faster start of play and better quality of streaming. Although the flows in FIG. 8 continue to be listed as new Flow 1 and New Flow 2, at Time T2 these flows may be considered existing flows.

Figure 9:
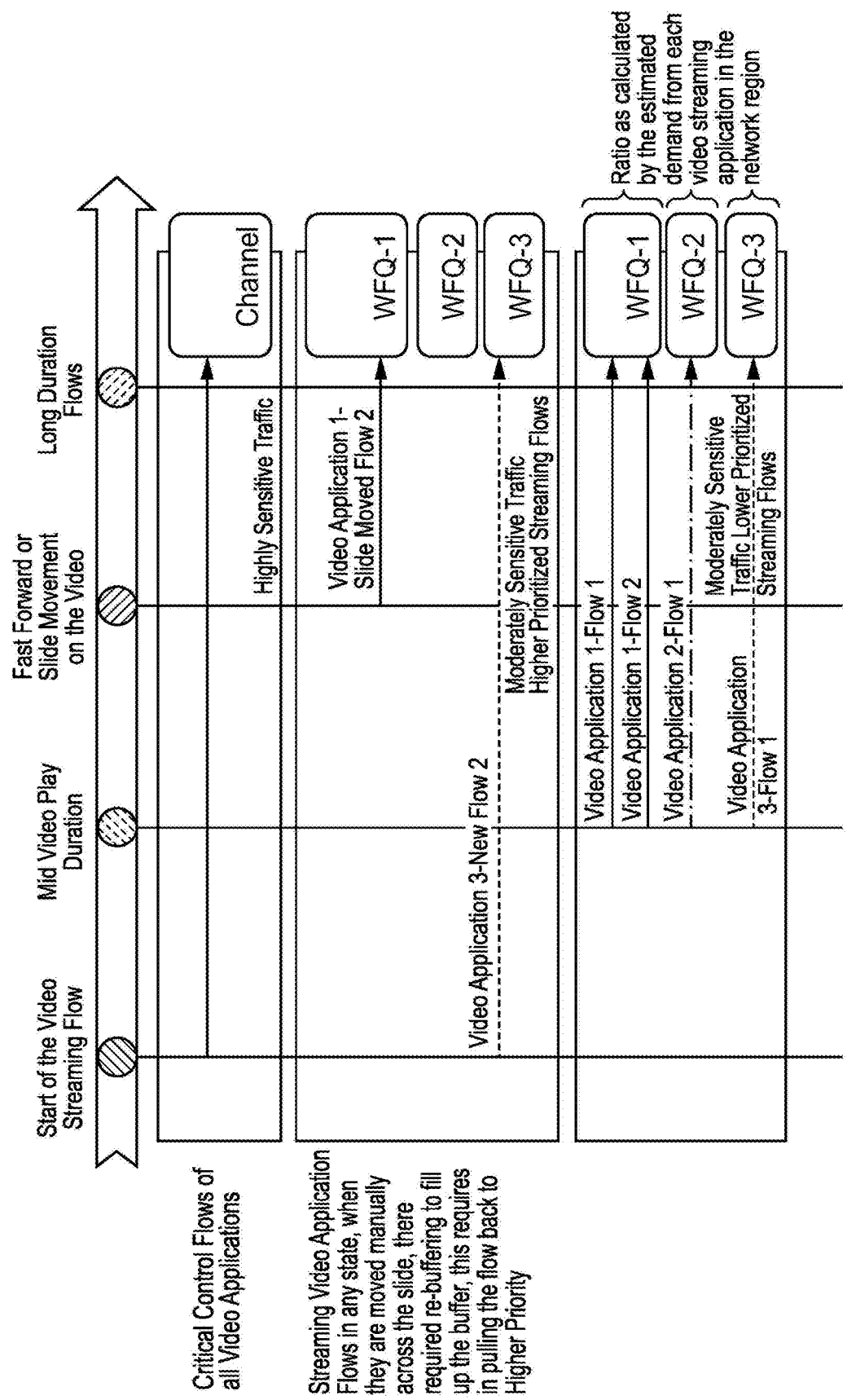
FIG. 9 illustrates a video streaming traffic flow prioritization at a re-buffering state.

FIG. 9 illustrates an example of video streaming traffic flow prioritization at, for example, a re-buffering state. If a subscriber or viewer scrolls past a previously buffered point of the video stream, the system is configured to consider the video streaming traffic flow as a new stream and provide the stream with a higher prioritization and more bandwidth. This is intended to provide the viewer with a stall free Video steam.

FIG. 9 illustrates three different scenarios. FIG. 9 illustrates a new video streaming traffic flow started for an application of type 3. The system provides for this application to start at a higher priority in an initial Start category. The traffic flows, which were started at the previous timelines T1, continue on the Lower Priority and fills up the extra buffer at a pace to allow the video to play consistently. The video started at T2, is now moved from Higher Priority to the next lower priority as the video has progressed past the initial start phase.

It is intended that the video streaming that was started earlier may now be running at a constant pace. At some time in the Video, a user may choose to move the video slider forward in video time (or in some cases may move the video slider back in time). At this time, the system can be configured to provide the video stream the same priority and share of bandwidth as a newly started video. This is intended to provide for quick and healthy buffer creation, which is intended to allow the video to start quickly after the slide. As shown in FIG. 9, the new flow for that Video stream is returned to a Higher Priority—as noted in FIG. 9 as Video Application 1—Slide Moved Flow 2.

In some cases, the system, via for example the measuring module 110, may be configured to define a measurement to identify the Video Quality, for example, whether the video is standard definition or high definition and provide, for example, Fair Enough Bandwidth for a Subscriber or Geographical location by sampling the number of video flows and their Short(age)/Long flows running. These additional measurements may be used by the analysis module 105 in order to provide input to the system to prioritize and enforce prioritization on the various video streaming flows.

Embodiments of the method and system are generally intended to operate on an aggregated basis, for example, by a group of subscribers in a single geographical location or the like to present a positive effect on the subscribers and overall impact on the location. As such, the traffic optimization policies may be applied on an aggregate location, group of subscribers (for example, a tier) or the like.

In a specific example, the following order of priorities may be applied through the policy language and Shaper definitions.

Priority 1: All Critical Applications like VoIP, Web browsing

Priority 2: Video Streaming Classification & Prioritization. Classified as Weighted Fair Queues with appropriate measured ratio in peak duration WFQ1: Video streams of Application-A that are in the 'Initial Buffering State' phase: Ratio R1

WFQ2: Video streams of Application-B that are in the 'Initial Buffering State' phase: Ratio R2

Priority 3 with or without WFQ: Video streams of Applications that are in the 'Mid Video Play Cycle' phase: Ratio R3

Priority N: Bulk Downloads and File transfers

It will be understood that video flows may be further classified to add the flows that have had the Video State Change or in order to manage the Re-buffering may be reclassified to the Priority 2 WFQs. It will be understood that this reclassification is intended to enhance the Video Streaming Quality on Demand.

Embodiments of the method and system have been tested and the outcome was analyzed with the following applications and metrics as standard KPIs.

Speed Test Latency and Bandwidth analysis

Effective per Subscriber Bandwidth for Video Application A and Video Application B Performance of Video content streaming servers hosted inside the network. In some cases, users instead of going through the Internet and getting to remote content servers, are redirected to locally hosted streaming servers which may be inside the ISP premises for better streaming quality.

FIGS. 10A to 10D illustrate histogram measurements capturing the average throughput of the video flows captured during congested hours on a network. In this example, data was measured between 21:00 to 03:00 on a plurality of days which included both weekdays and weekends.

Figure 10A:
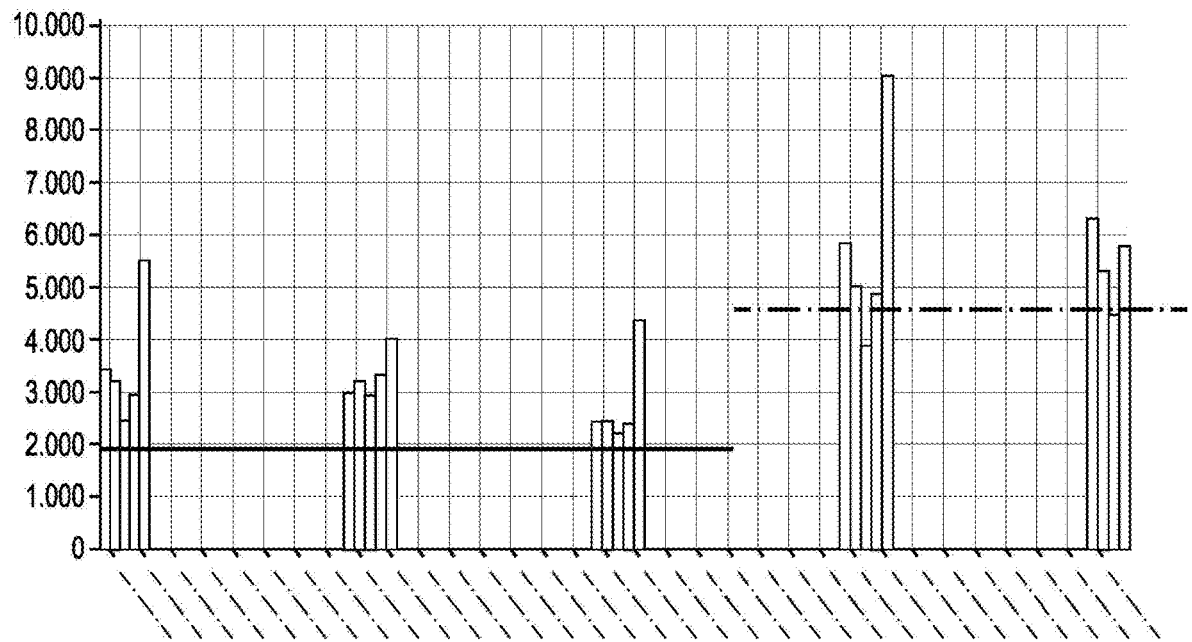
FIGS. 10A to 10D show graphs illustrating a comparison of a first video application on peak hours with various video streaming management.
Figure 10B:
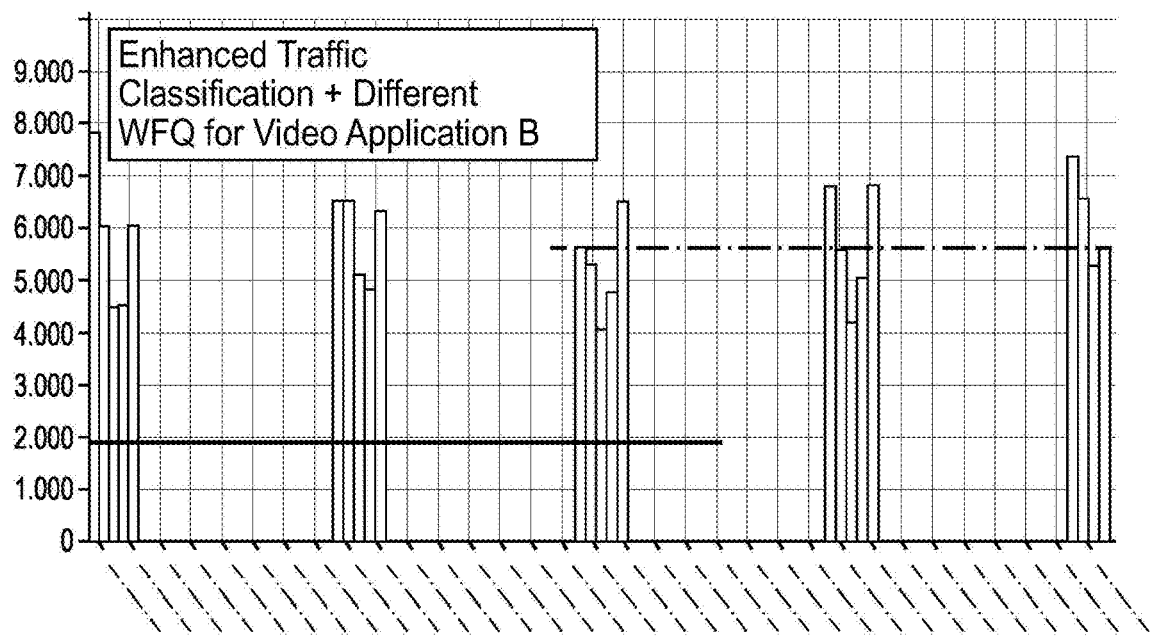
Figure 10C:
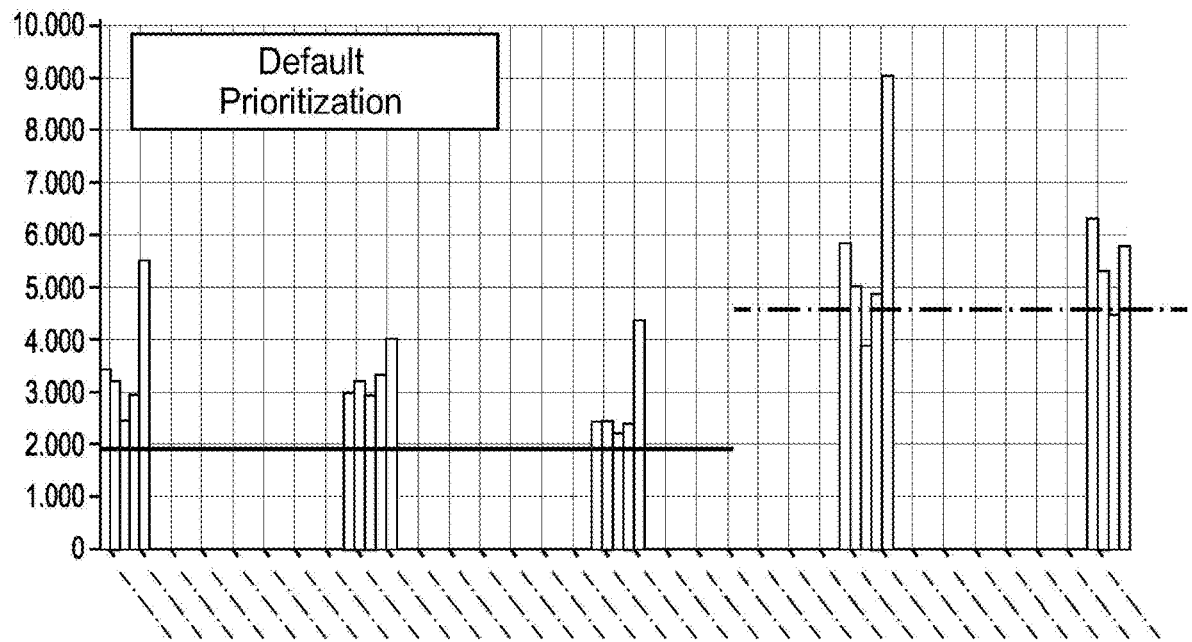

FIG. 10A illustrates measurements captured for Application A without any traffic optimization. FIG. 10B illustrates measurements captured with typical traffic optimization where there is no explicit pacing of the Video flows. FIG. 10C illustrates measurement captured where an embodiment of the method and system have been used to manage the video streaming. In this figure, it can be seen that the Initial Buffering State of the Video streams of each application are segregated as different WFQ based on the ratio of their bandwidth requirement. The 'Mid Video Play Cycle' phase of the Video streams are aggregated and included under the same priority, but a different WFQ with its relevant weightage as measured.

FIG. 10C illustrates the prioritization of traffic in such a way that all the Video Stream traffic are prioritized as Higher Priority. Each of the Video Application traffic is categorized as separate Weighted Fair Queue based on their Ratio of traffic in the network (which may be determined by the measurement module). In this case, all the traffic irrespective of the Video State (Start/Mid-Flow) is put under same priority.

Figure 10D:
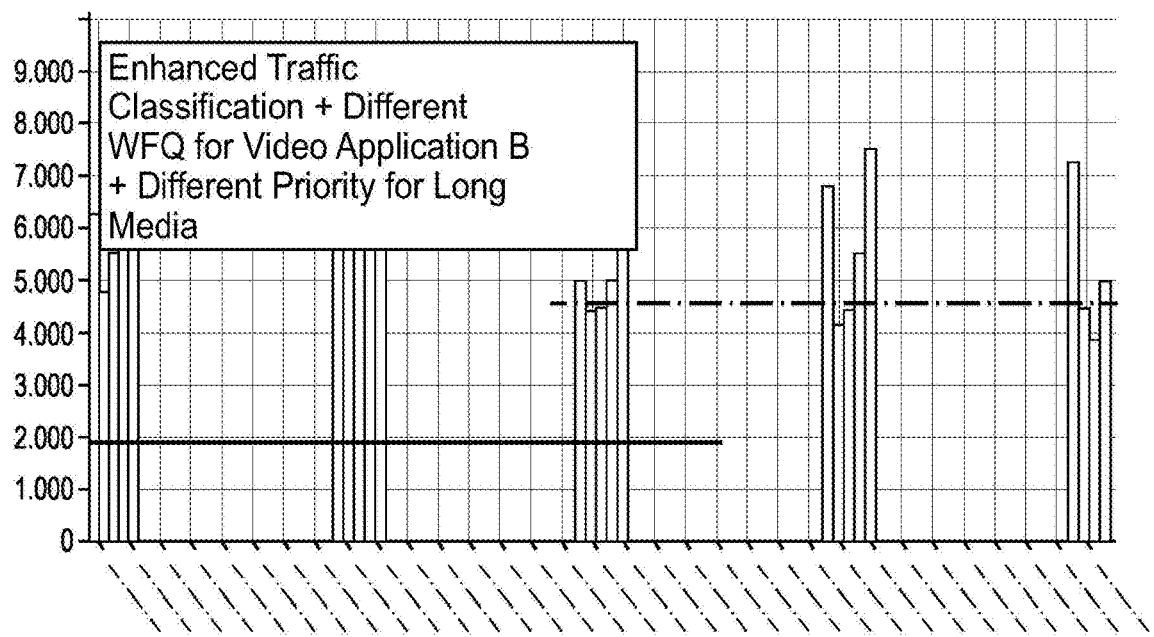

FIG. 10D illustrates a histogram using an embodiment of the system and method detailed herein with the 'Mid Video Play Cycle' phase of the Video streams. The Mid Video Play Cycle streams are aggregated and put under a lower priority than 'Initial Buffering State' phase with different WFQ for applications with its relevant weightage as measured. This relevant weightage may be defined in the measurement module, for each of the Video stream applications (Netflix, YouTube, and the like) and each video stream's corresponding Video State (Start, Mid-Play, End) has their share in the network. These relevant weightage are applied as the Weights for the Weighted Fair Queue to the Traffic Shaper's individual Traffic Priorities such that each application gets their fair share.

Figure 11A:
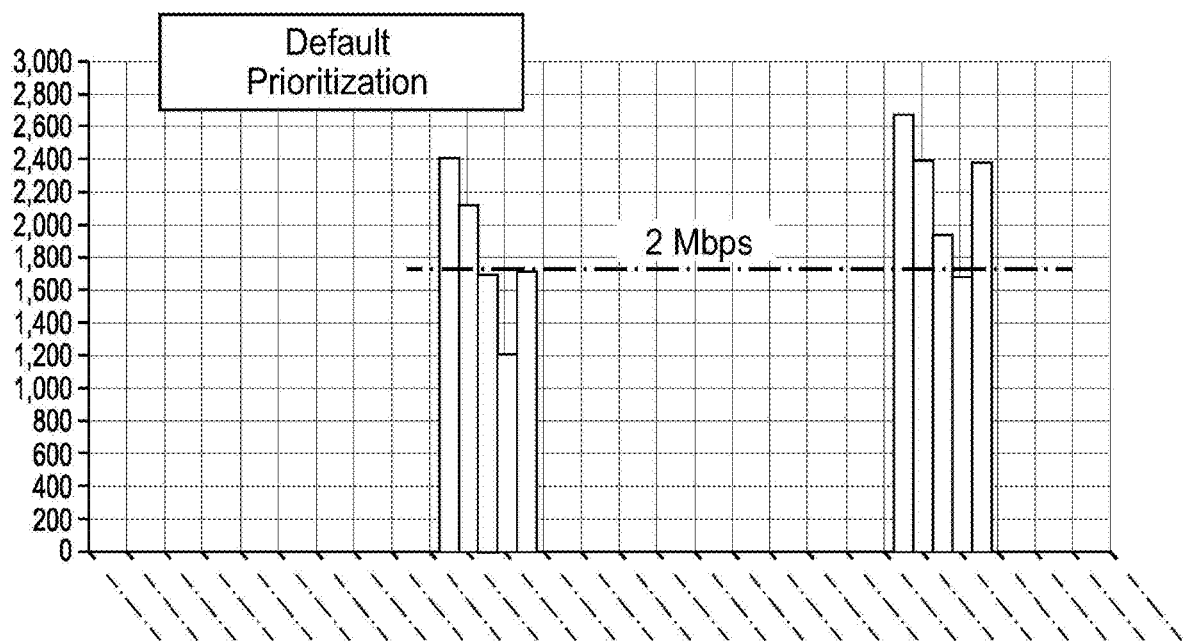
FIGS. 11A to 11D show graphs illustrating a comparison of a second video application on peak hours with various video streaming management.
Figure 11B:
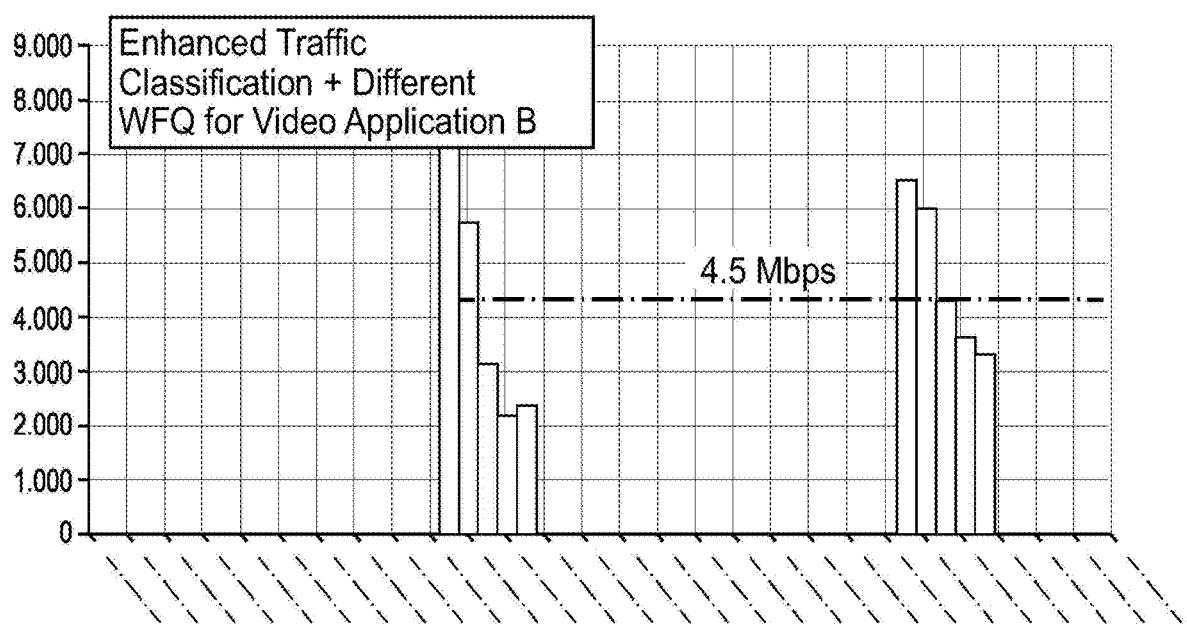
Figure 11C:
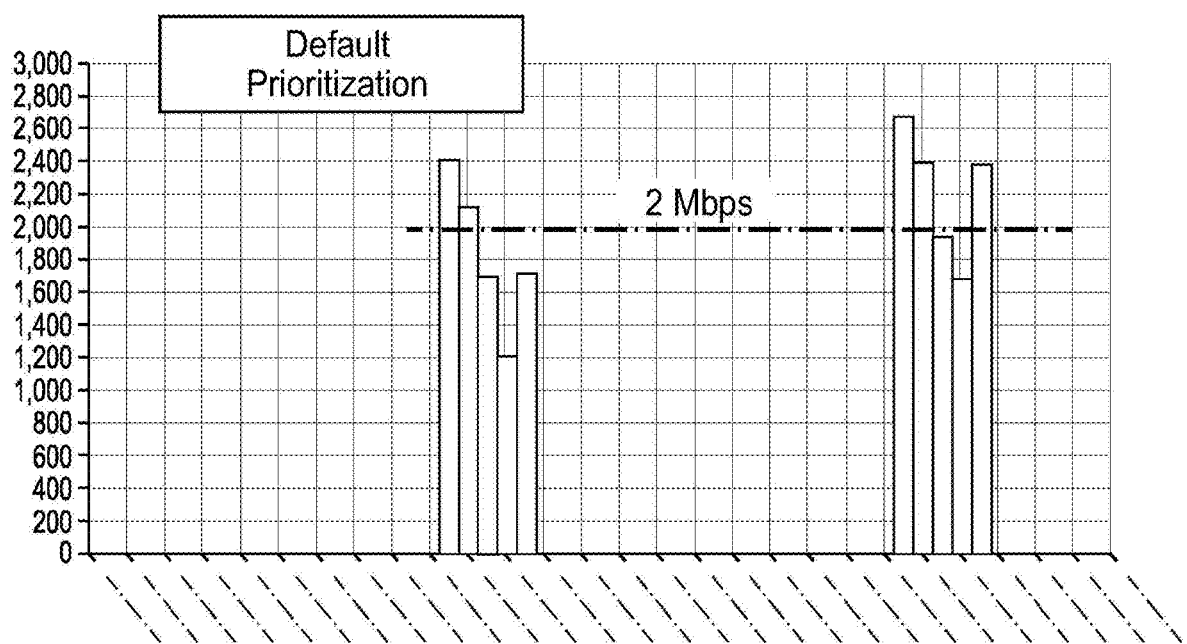
Figure 11D:
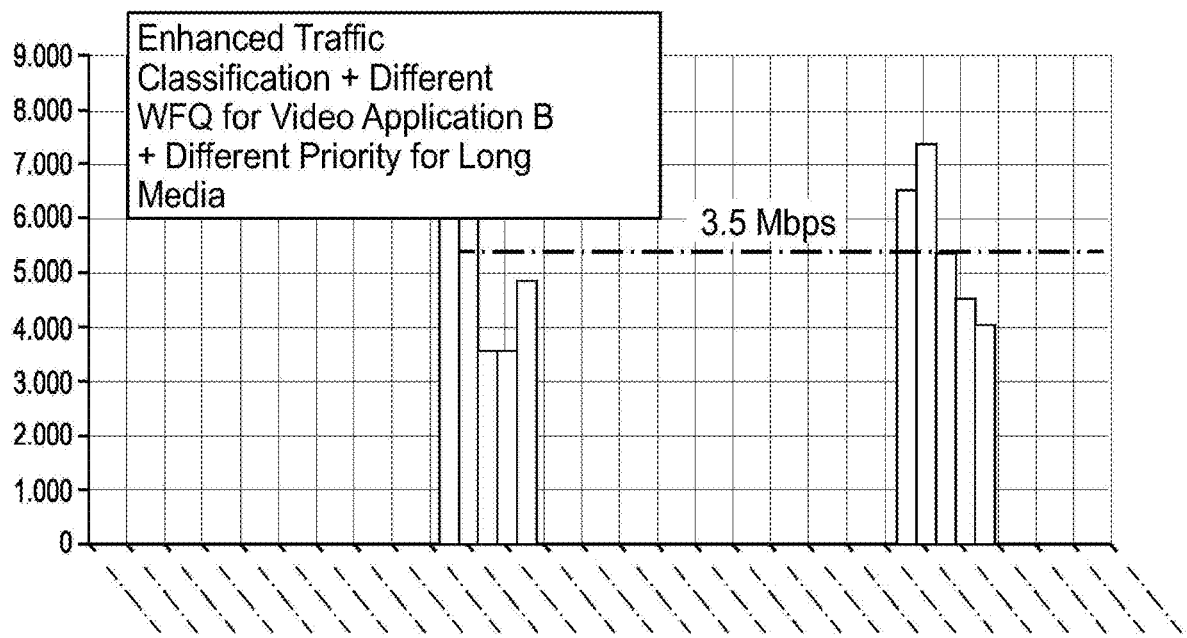

FIG. 11A illustrates measurements captured for Application B without any traffic optimization. FIG. 11B illustrates measurements captured with typical traffic optimization where there is no explicit pacing of the Video flows. FIG. 11C illustrates measurement captured where an embodiment of the method and system have been used to optimize the video streaming and FIG. 11D illustrates a histogram using the embodiment of the system and method detailed herein with the 'Mid Video Play Cycle' phase of the Video streams for Video stream application B.

The Video Application A, may be a typical video streaming application that has a higher share of bandwidth and which had unique characteristics that may be considered aggressive in bandwidth consumption. The Video Application B, which may be a video streaming application that has a lower share of bandwidth demand and has characteristics that are not as aggressive, was impacted during the congestion (possibly also impacted by aggressive nature of Video Application A in consuming the available bandwidth) resulting in latency and packet loss.

From FIGS. 10A, 10B, 11A and 11B it can be seen that the quality of the video stream for Applications A & B, did not significantly vary (or improve) though there was generic traffic prioritization or traffic shaping applied. In these representations, video streaming traffic flow is generally classified along with generic traffic.

FIGS. 10C and 11C show that the video stream (Application B) that was in need of more bandwidth in (as shown in FIGS. 10A, 10B, 11A and 11B) had received a share of bandwidth that the application needed to have resulting in 2× better traffic rate. This increase in traffic rate would in turn improve the video quality. At the same time, the aggressive Application A is not deprived of an adequate share of the bandwidth as it gets its fair share. As such, Application B is able to see an improvement while Application A continues to have an appropriate quality and should not overly harm the QoE of the subscriber. This result is achieved by segregating and providing fair share of their independent bandwidth requirements for both high value Video streams.

FIGS. 10D and 11D illustrate that the video streams from both Applications A & B have had a further improvement on the bandwidth share during the critical 'Initial Buffering State' of the Video streams. This improvement is intended to be achieved by applying bandwidth boundaries by moving the buffer fill-up in 'Mid Video Play Cycle' to a lower priority than the start of the video or 'Initial Buffering State' phase.

FIGS. 10D and 11D (which illustrates long media flows in 'Mid Video Play Cycle' and onwards) are the intended results of embodiments of the system and method detailed herein. Though Application Type A and Application Type B belong to two different applications, may be video streaming technologies, the system and method are intended to be adaptable and provide for effective improved QoE for the Video streaming applications. The Application Type B, which was not performing as well prior to the use of embodiments of the system and method, performed significantly better with the system and method by improving the average throughput from 2 Mbps to 5.5 Mbps per video stream. At the same time the Application Type A, which was more aggressive among the two applications, had consistently performed well above 4 Mbps by having its effective share of the bandwidth and did not have negative impact in traffic rate (bandwidth share per Video stream). As shown in the figures, more granular traffic management taking into consideration, the Video State, Video Application and other measurements has shown good improvement in Quality of Experience for these Video Streams.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for managing video streaming on a computer network, the method comprising:
    reviewing a traffic flow to determine whether the traffic flow is a video streaming traffic flow;
    determine at least one video characteristic associated with the video streaming traffic flow;
    determining a state of the video streaming traffic flow;
    determining a priority of the video streaming traffic flow based on the at least one video characteristic and the state of the video streaming traffic flow;
    determining application type of the video streaming traffic flow as one of the at least one video characteristic;
    determining a ratio of bandwidth consumption for the application type associated with the video streaming application; and
    allocating bandwidth to the video streaming traffic flow based on the priority and the ratio of bandwidth consumption for the application type.

2. The method according to claim 1, wherein the state of the video streaming is determined to be one of an initial state, a mid-play state or an end state.

3. The method according to claim 2 wherein, if the video streaming traffic flow is determined to have the initial state, the video streaming is designated a high priority traffic flow.

4. The method according to claim 3 wherein the initial state is between 30 and 60 seconds.

5. The method according to claim 2 wherein, if the video streaming traffic flow is determined to be mid-play the video streaming traffic flow priority is lowered.

6. The method according to claim 1, further comprising:
    determining if the video streaming traffic flow has had a fast forward, rewind or seek operation performed; redetermining the state of the video based on the operation performed; and reprioritizing the video streaming traffic flow based on the redetermined state.

7. The method according to claim 1, further comprising:
    monitoring a Quality of Experience (QoE) associated with the video streaming traffic flow; and reprioritizing the traffic flow based on the QoE.

8. The method according to claim 1, wherein allocating bandwidth for the video streaming traffic flow comprises determining a weighted fair queue for the video streaming traffic flow based on the streaming application type and application's type ratio of demand for bandwidth.

9. The method according to claim 1, wherein measuring the ratio of the bandwidth consumption for the application type comprises:
    capturing a bandwidth demand for each of a plurality of video streaming applications type; aggregating the bandwidth demand for each of the plurality of video streaming applications over an aggregating factor; and determining the ratio of bandwidth consumption for each application type based on the aggregated bandwidth demand.

10. The method according to claim 9 wherein the aggregating factor is selected from the group comprising: a geographic location, a cell site, a group of subscribers in a link, a group of subscribers in a network.

11. A system for managing video streaming on a computer network, the system comprising:
    an analysis module configured to review a traffic flow to determine whether the traffic flow is a video streaming traffic flow, and if the traffic flow is a video streaming traffic flow, determine at least one video characteristic associated with the video streaming traffic flow and a state of the video streaming traffic flow and an application type of the video streaming traffic flow as one of the at least one video characteristics;
    a measuring module configured to determine a ratio of bandwidth consumption for the application type associated with the video streaming application;
    an allocation module configured to determine a priority of the video streaming traffic flow based on the at least one video characteristic and the state of the video streaming traffic flow; and
    at least one shaper configured to allocate bandwidth to the video streaming traffic flow based on the priority and on the ratio of bandwidth consumption for the application type.

12. The system according to claim 11, wherein the state of the video streaming is determined to be one of an initial state, a mid-play state or an end state.

13. The system according to claim 12, wherein, if the video streaming traffic flow is determined to have the initial state, the video streaming is designated a high priority traffic flow.

14. The system according to claim 12 wherein, if the video streaming traffic flow is determined to be mid-play the video streaming traffic flow priority is lowered.

15. The system according to claim 11, wherein the analysis module is further configured to determine if the video streaming traffic flow has had a fast forward, rewind or seek operation performed and redetermine the state of the video based on the operation performed; and the allocation module is configured to reprioritize the video streaming traffic flow based on the redetermined state.

16. The system according to claim 11, further comprising: a monitoring module configured to monitor a Quality of Experience (QoE) associated with the video streaming traffic flow; and wherein the allocation module is configured to reprioritizing the traffic flow based on the QoE.

17. The system according to claim 11, wherein the at least one shaper is configured to allocate bandwidth for the video streaming traffic flow comprises determining a weighted fair queue for the video streaming traffic flow based on the streaming application type and application's type ratio of demand for bandwidth.

18. The system according to claim 11, wherein the measuring module is configured to measure the ratio of the bandwidth consumption for the application type by: capturing a bandwidth demand for each of a plurality of video streaming applications type; aggregating the bandwidth demand for each of the plurality of video streaming applications over an aggregating factor; and determining the ratio of bandwidth consumption for each application type based on the aggregated bandwidth demand.

* * * * *